June 16, 1953  E. W. ANDERSON  2,641,798
SAUSAGE LINKING MACHINE
Filed Aug. 23, 1947  10 Sheets-Sheet 1

Inventor:
Eric W. Anderson
By: Kent W. Younell
Attorney.

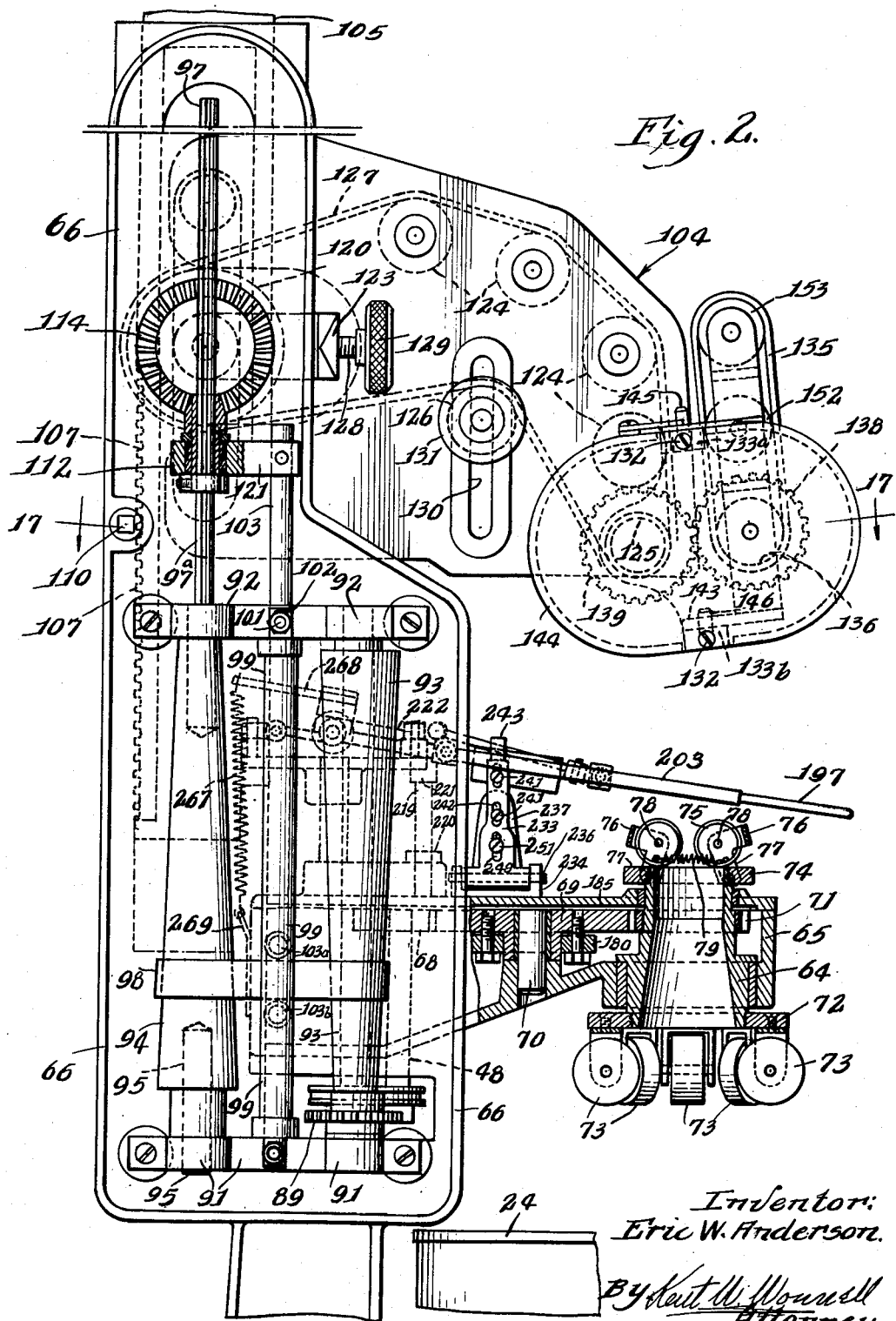

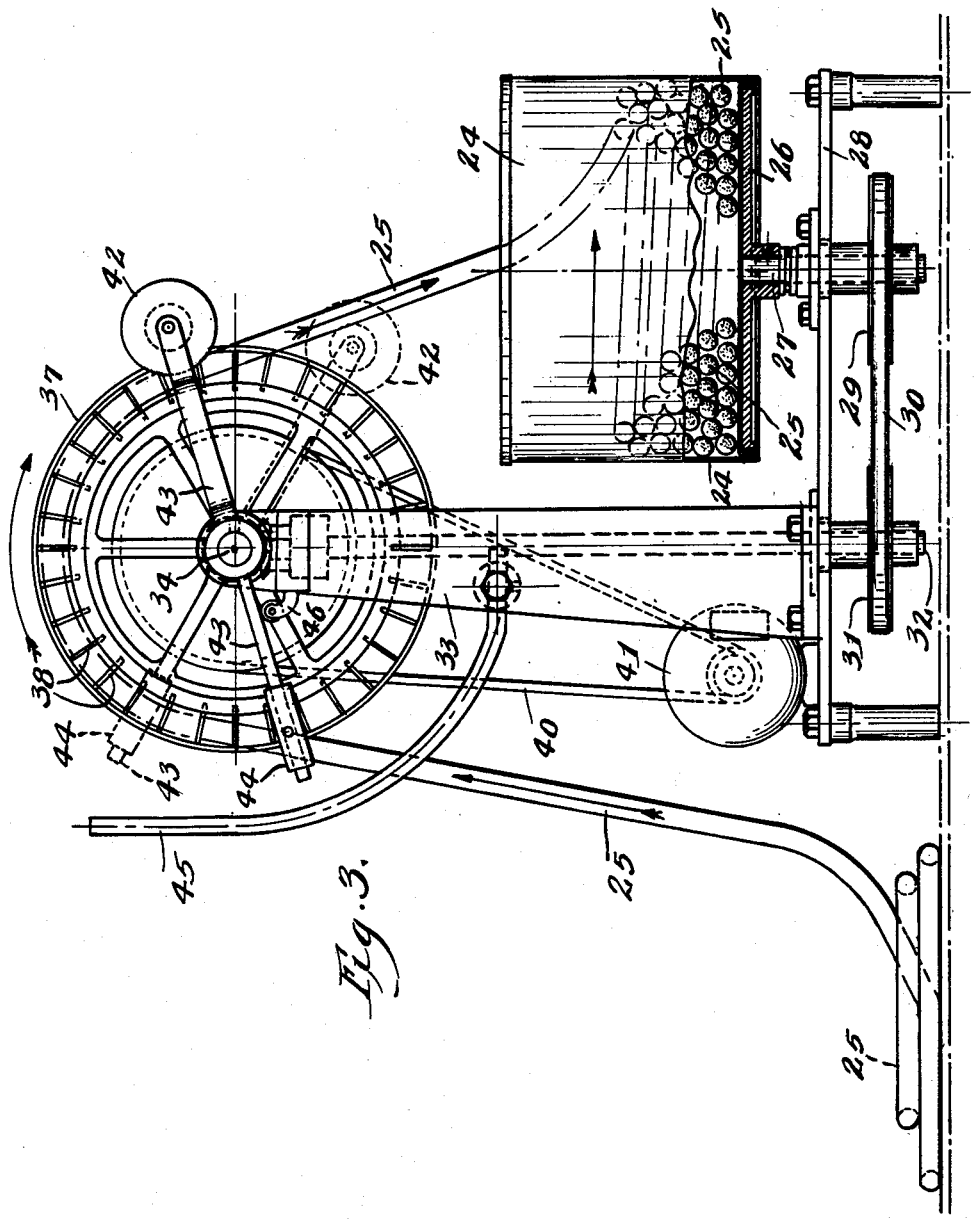

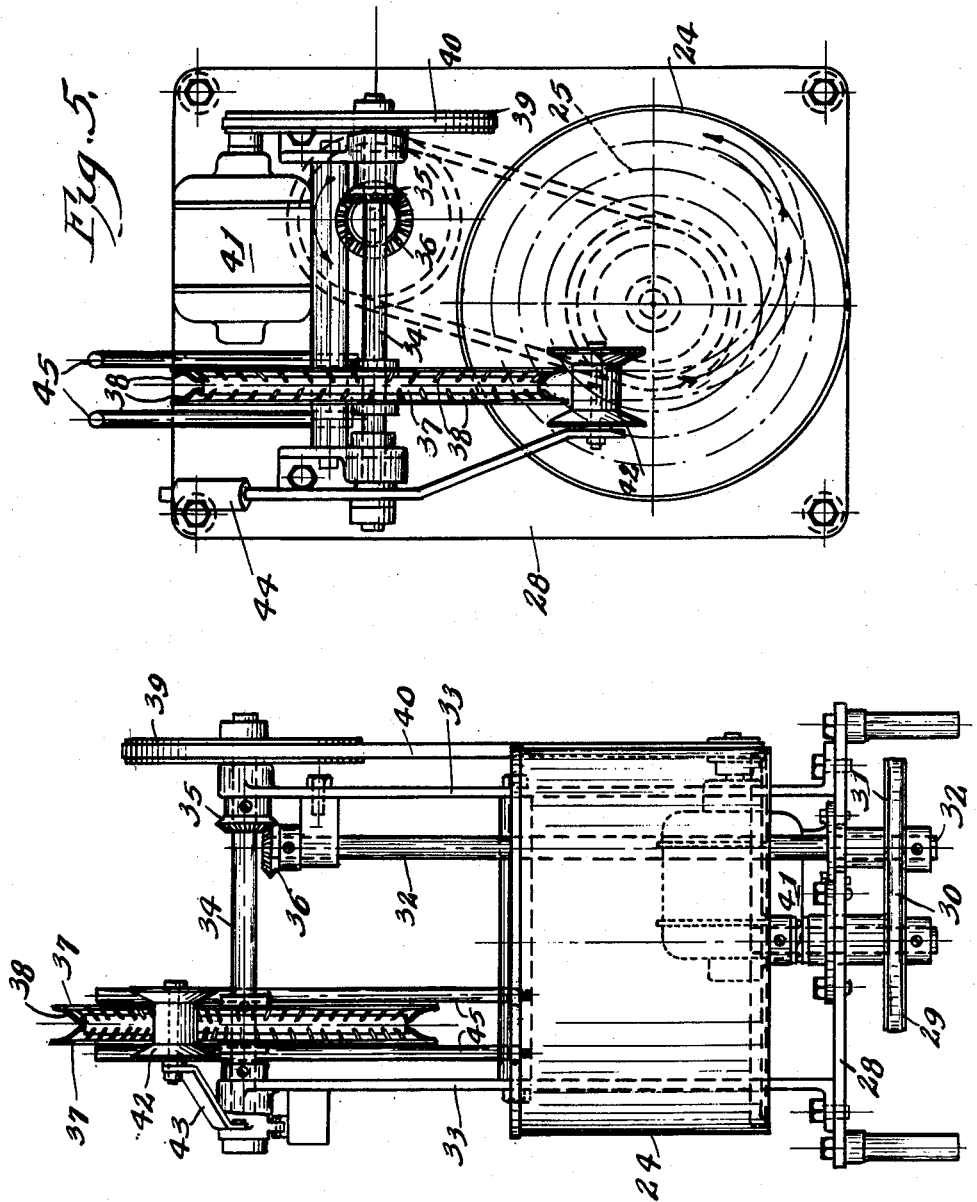

June 16, 1953  E. W. ANDERSON  2,641,798
SAUSAGE LINKING MACHINE
Filed Aug. 23, 1947  10 Sheets-Sheet 5
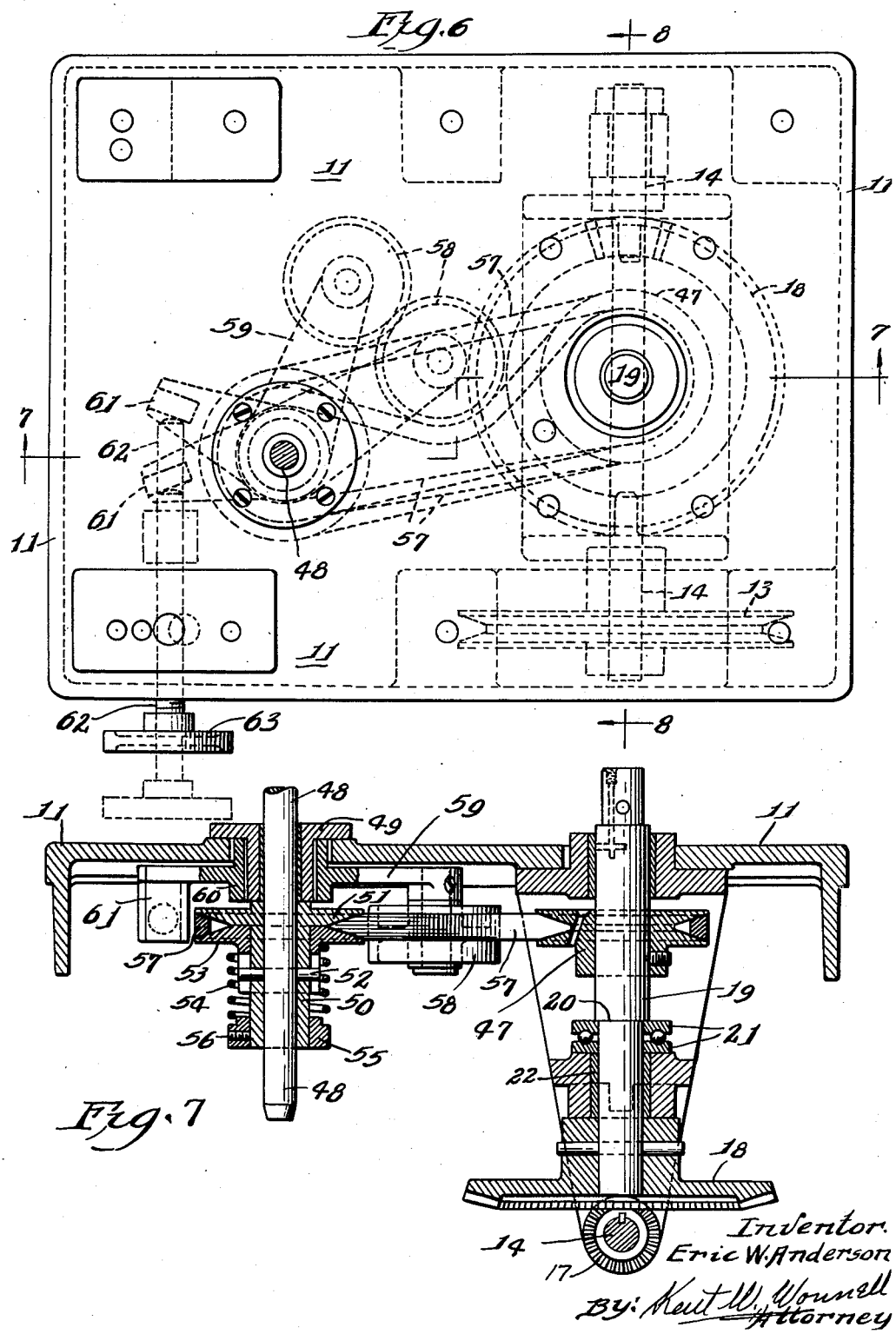

June 16, 1953 E. W. ANDERSON 2,641,798
SAUSAGE LINKING MACHINE
Filed Aug. 23, 1947 10 Sheets-Sheet 6
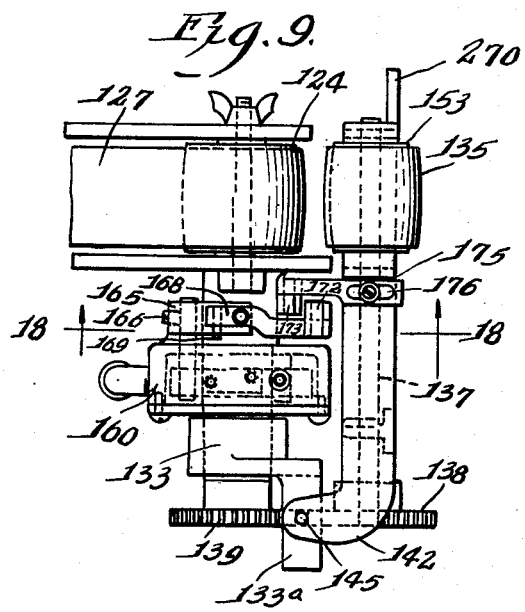
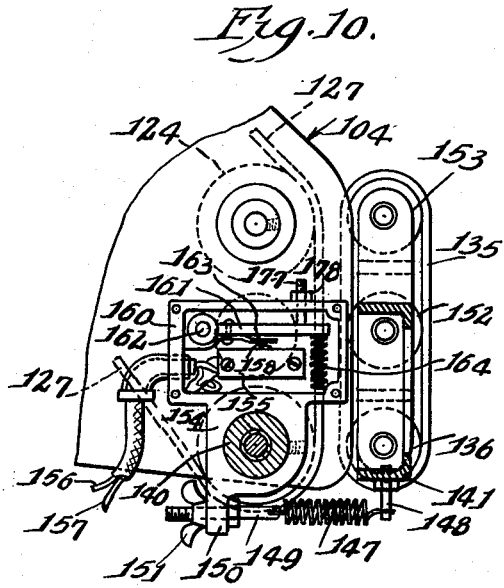
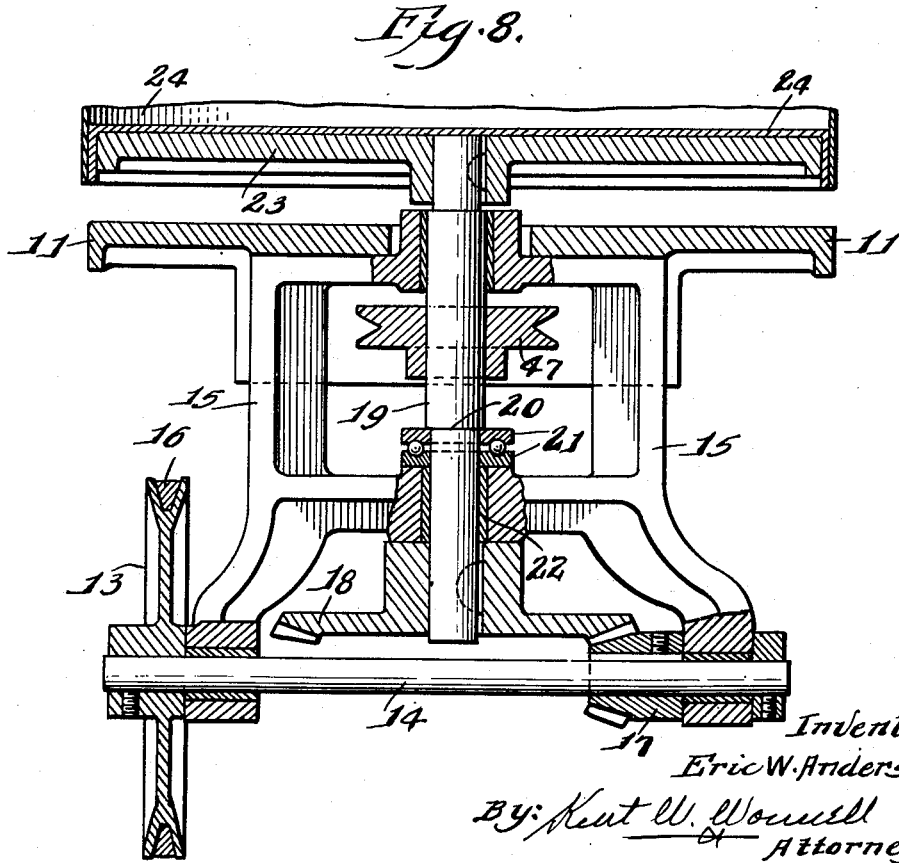
Inventor:
Eric W. Anderson
BY: Kent W. Worrell
Attorney.

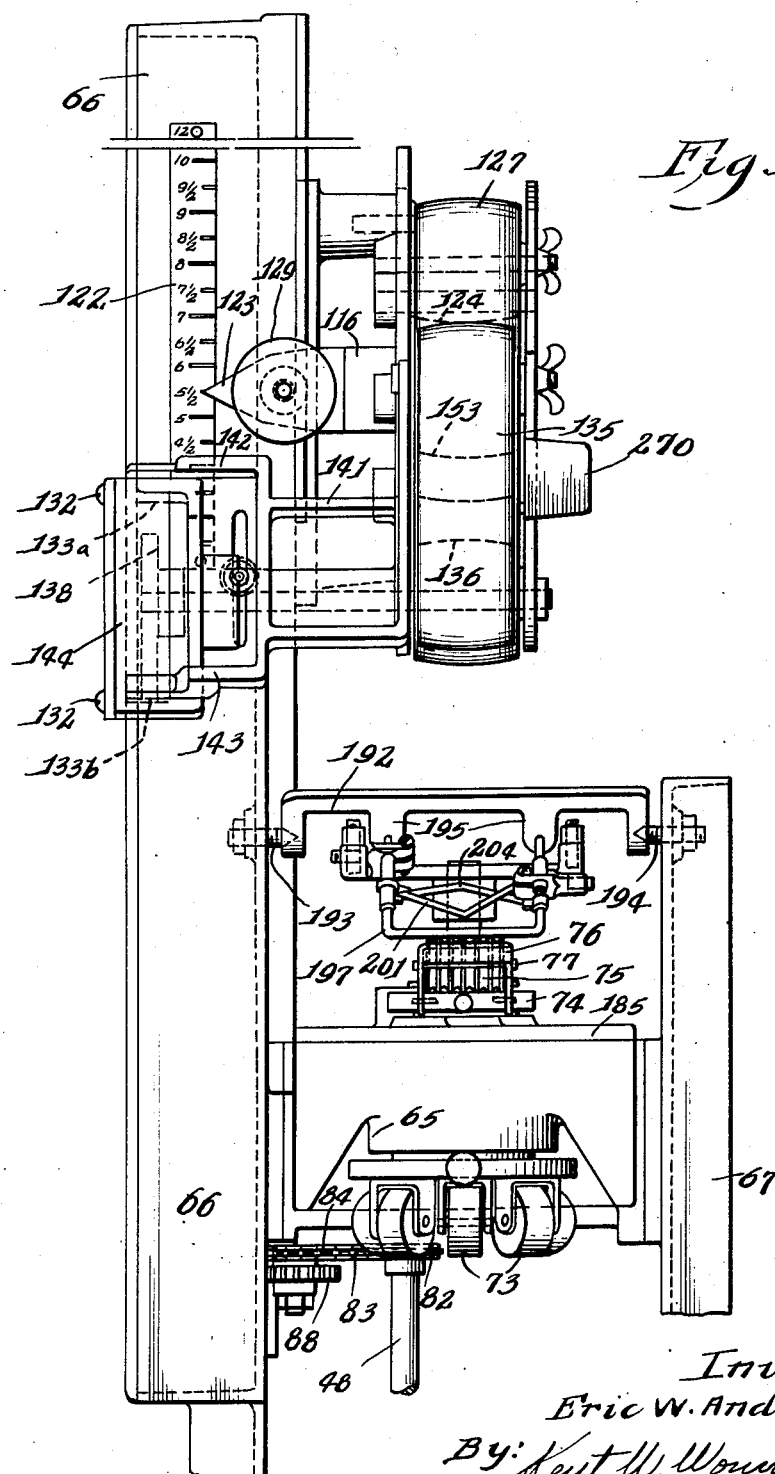

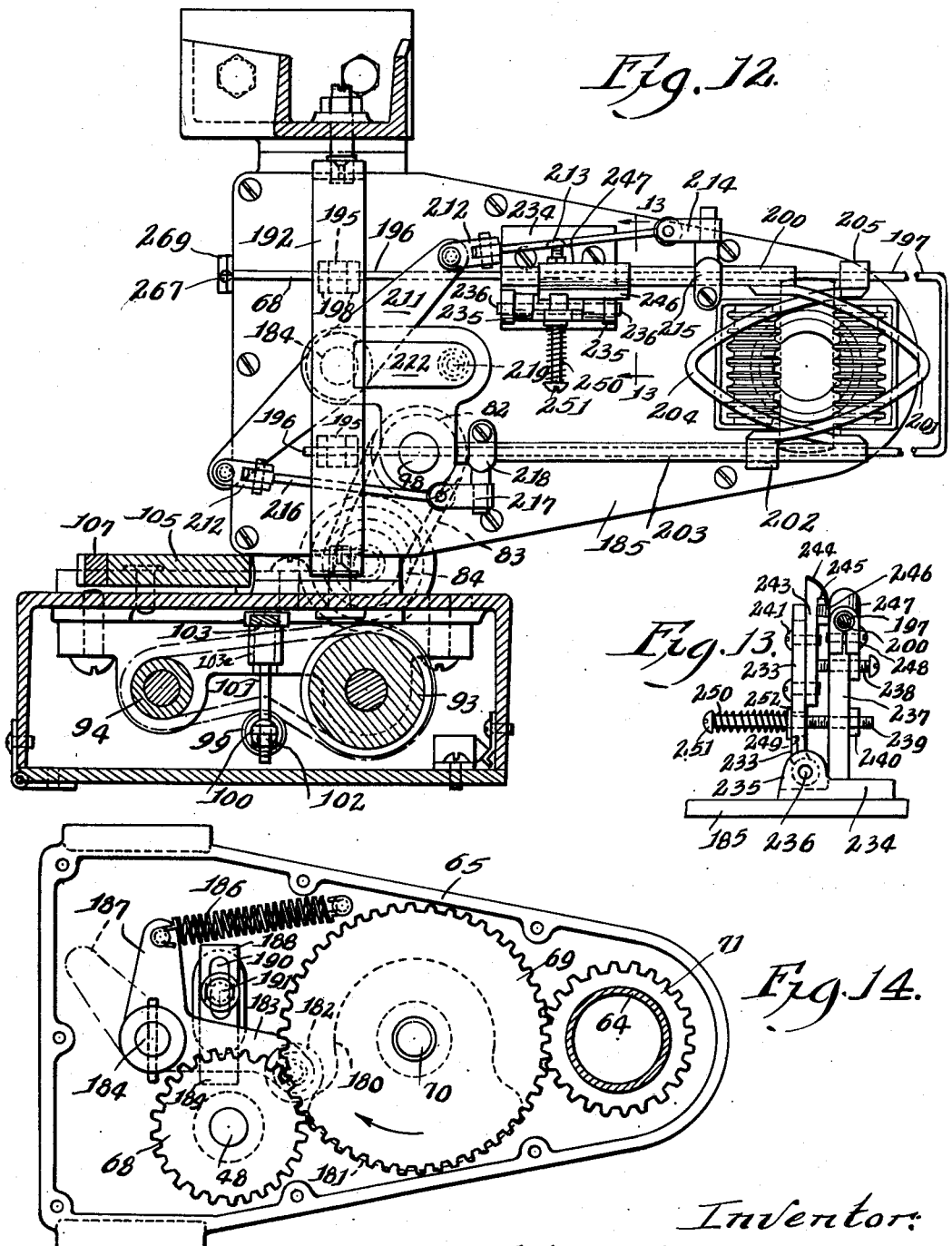

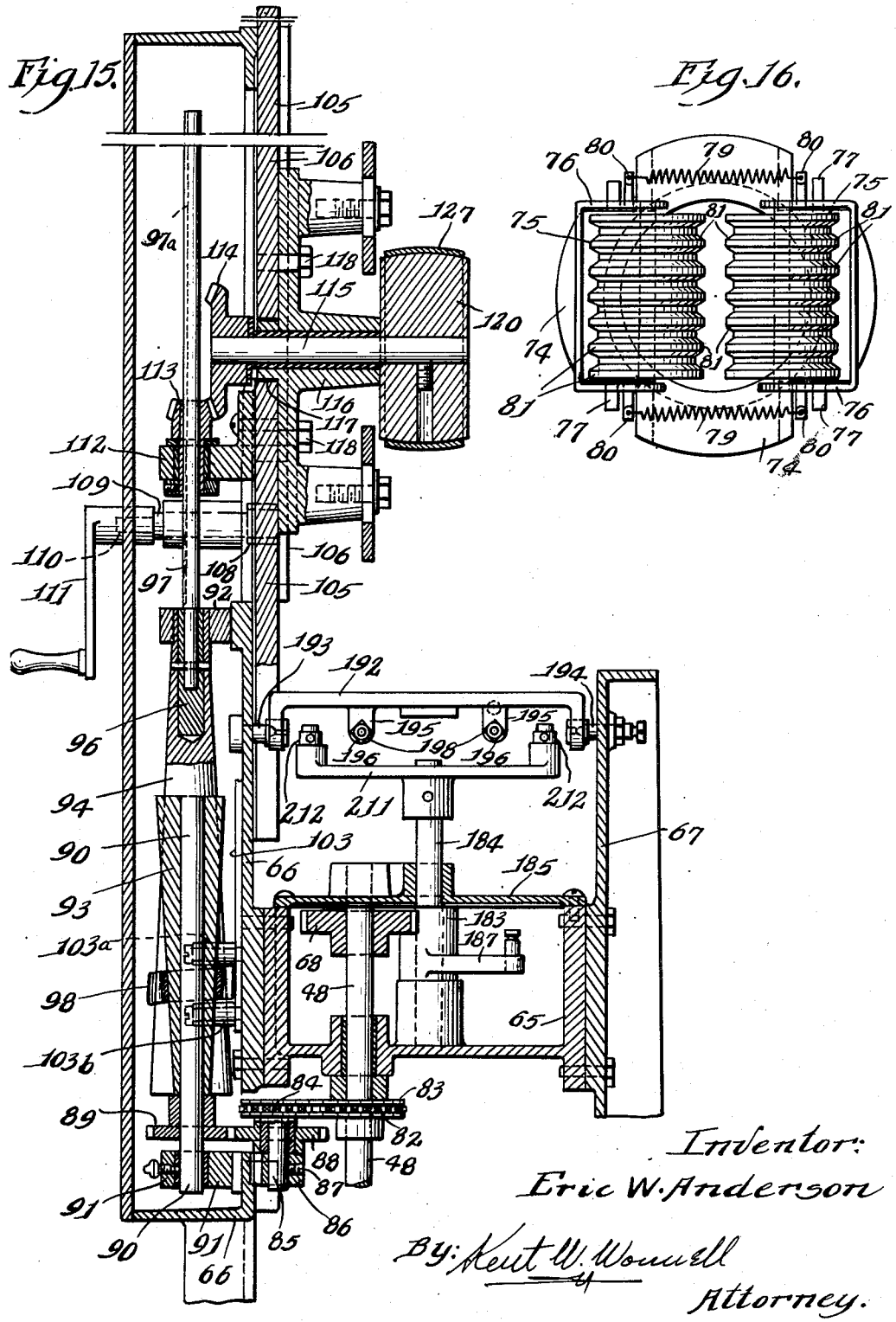

June 16, 1953 E. W. ANDERSON 2,641,798
SAUSAGE LINKING MACHINE
Filed Aug. 23, 1947 10 Sheets-Sheet 10
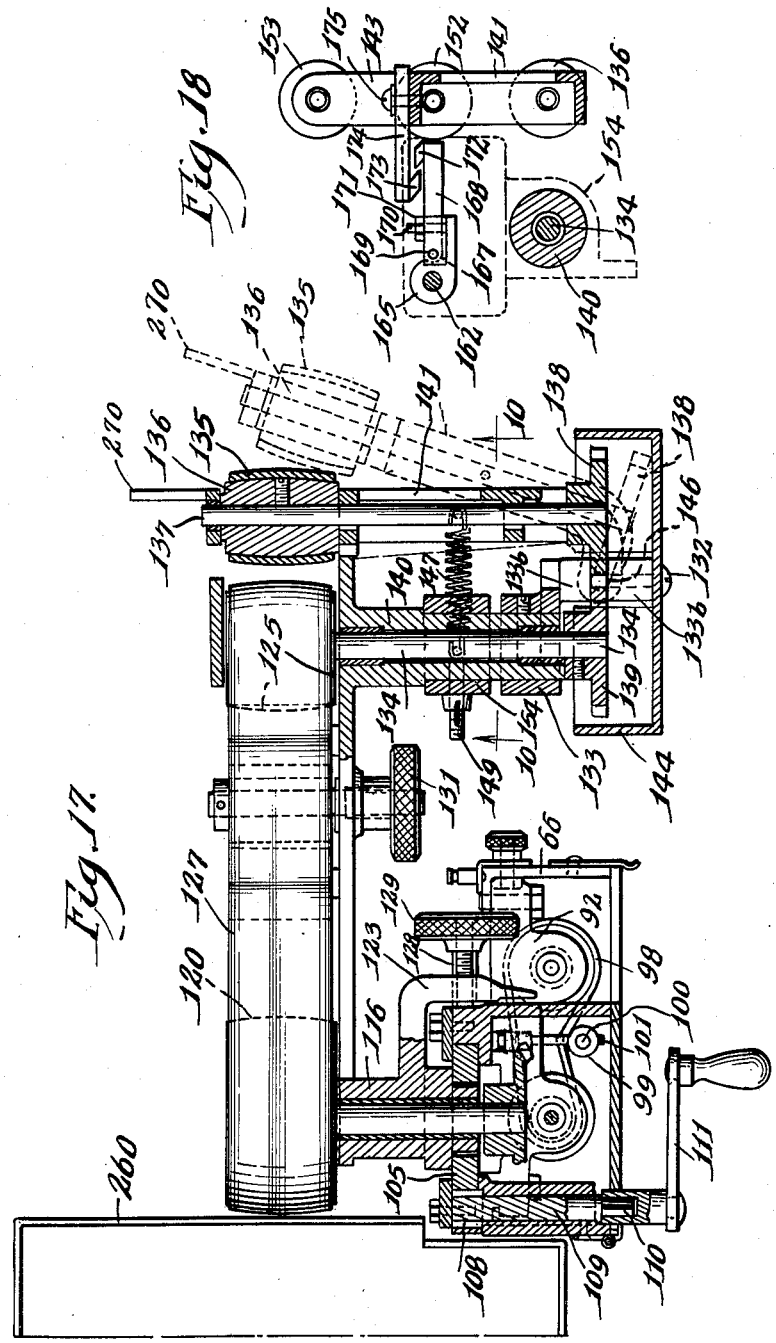
Inventor:
Eric W. Anderson.
By: Kent W. Worrell
Attorney.

Patented June 16, 1953

2,641,798

UNITED STATES PATENT OFFICE 2,641,798

SAUSAGE LINKING MACHINE

Eric W. Anderson, Chicago, Ill.

Application August 23, 1947, Serial No. 770,319

24 Claims. (Cl. 17—34)

This invention relates in general to a machine for forming links in a casing either a natural intestinal casing, or one made of paper or other similar materials and intended to cover the linking of frankfurters, larger links of sausage, or Bologna, and also the linking of other food products and materials such as cheese, and the like.

An important object of the invention is to provide a sausage linking machine which is capable of forming links not only in natural intestinal casing which are sometimes quite fragile, but also in the artificial casings of paper and similar materials which are more rugged and will stand rougher and more rigorous treatment without breaking.

Other important objects of the invention are: To provide means for coiling filled casings in a suitable container; to rotate the casing filled container as the sausage machine is operated; to suitably grip the filled sausage casing and to hold it while a link is formed; to perform the linkage continuously without stopping the progress of the filled casing in the machine; to carry the filled and twisted casing without breaking it during the operation; to vary the length of the links within the limits of the machine; to vary the drive of the casing container with the speed of the link forming mechanism; to provide automatic starting and stopping mechanism depending upon the presence of a casing in the machine; and in general to provide a complete operating sausage linking machine of this kind.

Other objects of the invention will appear in the specification and will be apparent from the accompanying drawings in which, Fig. 1 is a side elevation of a sausage linking machine in accordance with this invention;

Fig. 2 is an enlarged side elevation of the upper driving mechanism from the side opposite that shown in Fig. 1, some of the parts being shown in section;

Fig. 3 is a side elevation showing a link holding receptacle partially in section with the mechanism for coiling unlinked but filled sausage casings therein;

Fig. 4 is a front elevation of the mechanism shown in Fig. 3;

Fig. 5 is a top plan view of the mechanism shown in Fig. 3;

Fig. 6 is a plan view of the driving mechanism at the top of the supporting base;

Fig. 7 is a sectional view of the driving mechanism taken on the line 7—7 of Fig. 6;

Fig. 8 is a sectional view of the receptacle drive as taken on the line 8—8 of Fig. 6;

Fig. 9 is a detail plan view of the outer end of the driving head shown in Fig. 2;

Fig. 10 is a sectional view taken on the line 10—10 of Fig. 17;

Fig. 11 is an elevational view of the driving head and link feeding mechanism as taken from the right side of Fig. 2;

Fig. 12 is a plan view with the supporting parts in section of the link gripping assembly;

Fig. 13 is a sectional elevation taken on the line 13—13 of Fig. 12;

Fig. 14 is a plan view of the driving mechanism on the twisting head supporting arm;

Fig. 15 is a sectional view of the operating and adjusting mechanism in the driving head;

Fig. 16 is a top plan view of the rollers at the top of the sausage casing gripping rollers as shown in Fig. 2;

Fig. 17 is a sectional view of the driving mechanism as taken on the line 17—17 of Fig. 2; and Fig. 18 is a sectional view taken on the line 18—18 of Fig. 9.

Figure 1:
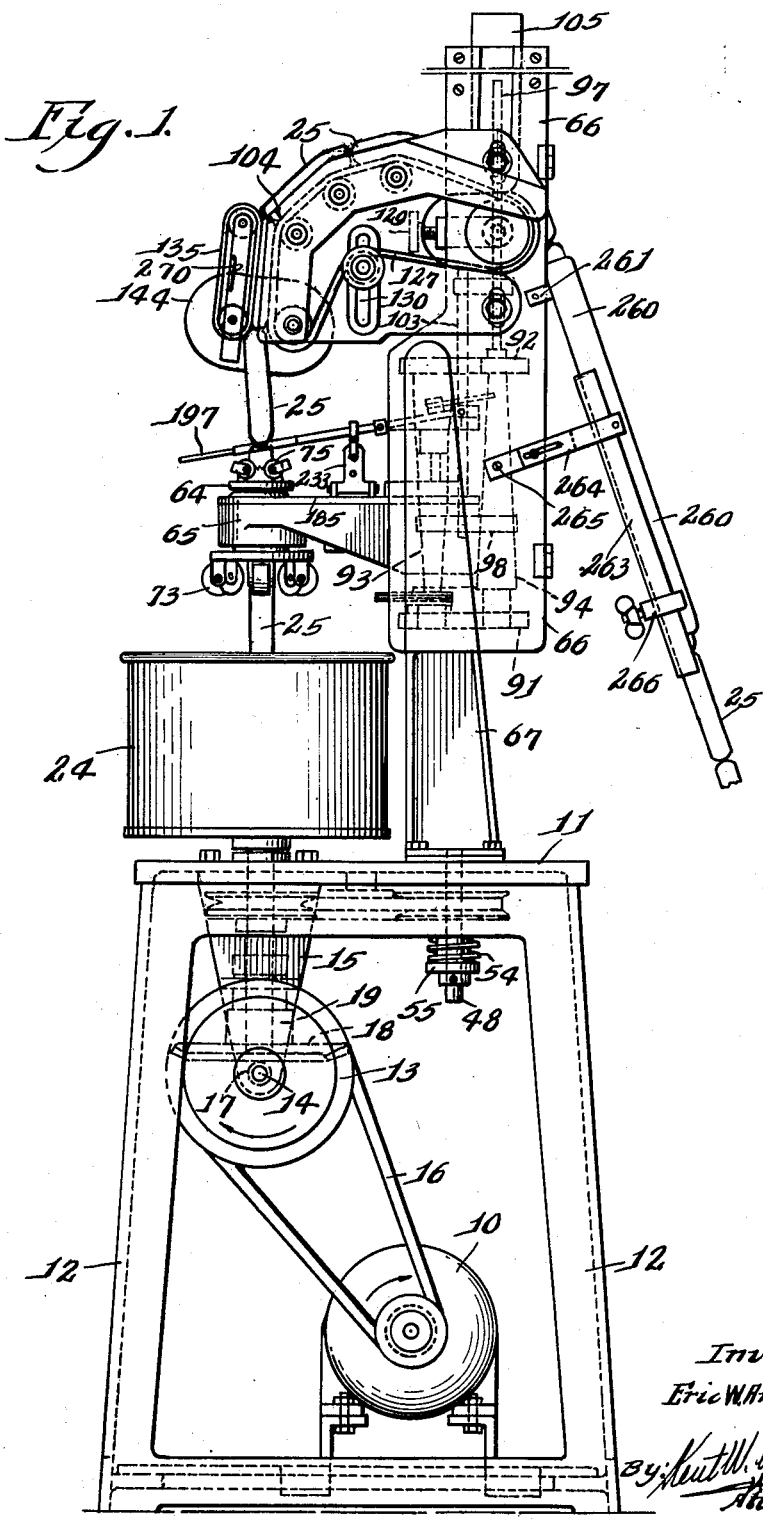

One of the major difficulties in providing a link forming machine of this kind is that it must be adaptable not only for use with animal casings, but also, it must be capable of use with the artificial or paper-like casings. The animal casings are naturally more delicate, easily broken and liable to require frequent stoppages of the machine, whereas the artificial casings are somewhat stronger and require a stiffer and more rigid application of the machine parts to affect the desired twisting and casing linkages. A machine which is strong enough to accommodate the artificial casings is often too stiff and cumbersome to accommodate the lighter and more fragile animal casings more successfully without breaking them. The present invention overcomes these objections by providing gripping and feeding mechanism which is so sensitive that it will firmly grip the casing, either animal or artificial, and feed them positively to a holding rack utilizing grippers which move with the casing as it is fed continuously, and providing means for stopping the machine if the linked casing is broken on the feeding rack.

While the present exemplification of the invention is described in connection with sausage linking, it is understood that this mechanism is also applicable to all types of casing filled meat products from the smaller frankfurter sizes to the larger Bologna or head cheese types, and also to casing for other food products such as cheese, dog food, as products, and the like.

Referring now more particularly to the drawings, the invention is described as applied to a sausage linking machine which utilizes medium size casings, although it may be similarly applied for larger or smaller casings. A driving motor 10 is suitably mounted below a raised base 11 which has depending legs 12. A driving pulley 13 is mounted upon a shaft 14 supported in a bracket 15 secured to the under side of the base 11 and is connected to the motor by a driving belt 16. Also mounted upon the shaft 14 is a bevel gear pinion 17 which meshes with a driving gear 18 secured to a vertical shaft 19 mounted also in the bracket 15 and extending through the base 11.

As shown more clearly in Fig. 8, the shaft 19 has a shoulder 20 for supporting a ball bearing 21 between it and a bearing 22 provided in the bracket 15.

At the upper end of shaft 19, a circular table 23 is supported for rotation with the shaft and this table is adapted to carry a container 24 for coiled but unlinked sausage in casings 25.

One or more lengths of unlinked sausage casings are coiled in each container 24 before it is applied to the linking machine either by hand or by a coiling mechanism shown more particularly in Figs. 3, 4 and 5. In this coiling mechanism, each container 24 is mounted upon a platform 26 secured to a shaft 27 mounted in a frame 28 with a pulley 29 secured to the end of shaft 27 which projects below the frame 28. A driving belt 30 extends around pulley 29 and also around a pulley 31 secured at the lower end of a shaft 32 mounted in the frame 28 and extending upwardly therefrom between upwardly extending supports 33 secured to the frame 28 and located outside of the periphery of the table 26. At the upper ends of supports 33 are bearings in which a cross shaft 34 is mounted, a bevel gear 35 being secured to the cross shaft and meshing with a corresponding bevel gear 36 secured to the upper end of the shaft 32.

Also mounted upon shaft 34 is a reel 37 comprising spaced side pieces and inwardly extending fingers 38 for receiving therebetween the filled sausage casings 25 which are passed over the reel and above an open top container 24 positioned upon the table 26, the relation being such that as the reel is rotated in the direction of the arrow as shown in Fig. 3, the container 24 is rotated in the direction of the arrow on the container, thereby coiling the casings within the container.

To rotate the reel 37, a pulley 39 is secured to cross shaft 34 and a driving belt 40 extending around the pulley also extends around the driving pulley of a motor 41 mounted upon the frame 28.

Successive lengths of uncoiled casings may be secured together and fed continuously over the reel 37 or the separate pieces may be fed individually. To automatically start and stop the motor, a contact roller 42 is mounted upon one arm of a lever 43 pivoted on cross shaft 34, the roller overlying the reel 37 and adapted to engage or retain an unlinked container on the reel. At the opposite end of the lever 43 is an adjustable weight 44 to vary the pressure of the roller upon the casing, depending somewhat upon the weight or thickness of the filled casing.

At the feeding side of the reel 37 and projecting upwardly from supports 33 are guides 45 which are spaced apart approximately the width of the reel and conform somewhat to the curvature thereof. As the unlinked casings are applied to the reel 37, they must first be inserted through and between the guides 45 which serve to direct them to the reel even though they are drawn from the floor or another support which is not in direct line with the reel and the guides.

Projecting from the adjacent support 33 is a contact switch 46 engaged by the weighted end of arm 43 for controlling the motor 41. To start the motor, a length of the filled casing must be passed over the top of the reel and under the roller 42 raising it to the full line position as shown in Fig. 3. This will move the weighted arm of lever 43 against the switch 46 closing a circuit connection (not shown) to the motor, causing it to rotate the reel and also the table 26 for coiling the casing in a container 24. When the last end of the casing has passed over the reel, or if the casing happens to break, there is no engagement of the casing with the contact roller 42, and instead of being held up in the full line position, it drops to the dotted line position as shown in Fig. 3, thereby moving away from the switch 46 which opens, causing the motor to stop.

A number of filled containers 24 are preferably prepared in advance or a sufficient number of them are available to maintain the linking machine continuously in operation, each container when emptied being removed from the linking machine rotating table 23, and another filled container being applied thereto.

Driving shaft 19 upon which the container rotating table 23 is mounted, also transmits power from the motor 10 for driving other parts of the linking machine. A driving pulley 47 is secured to shaft 19 intermediate its ends and preferably close to the underside of base 11 (see Figs. 6 and 7) and spaced from this shaft but parallel thereto also extending through the base is a countershaft 48. This latter shaft is mounted in a bearing 49 having a hub extending through the base 11 and secured to the shaft below this bearing is a variable drive mechanism of the split pulley type having a sleeve 50 with one side 51 of the pulley formed integral therewith and secured to the shaft by a transverse pin 52. Mounted on the sleeve adjacent the side 51 is another pulley side 53 engaged by one end of a spring 54, the other end of the spring being engaged by a collar 55 also mounted on the sleeve 50 and held adjustably thereon by a set screw 56.

A driving belt 57 is positioned between the pulley sides 51 and 53 at one end and the driving pulley 47 at the other end, and a friction pulley 58 engages the belt between these pulleys, the arrangement being such that as the belt is tightened by engagement of the pulley 58, the pulley side 53 is spread from the pulley side 51 against the tension spring 54, thereby varying the effective diameter of the pulley on the shaft 48 and changing the relative speed of the shaft 48. This friction pulley 58 is mounted on one arm of the lever 59 having a hub 60 rotatable upon the hub of bearing 49 and the other end of the lever 59 having a projection 61 adapted to be engaged by the extremity of a stem 62 which is threaded to extend through the adjacent side of base 11 and has a hand wheel 63 attached to the outer end of the stem so that by rotating the hand wheel, the lever 59 may be correspondingly adjusted, varying the tension of the friction pulley 58 upon the driving belt 57 and thereby changing the speed of the counter shaft 48 relative to the speed of the driving shaft 19.

To feed and twist the sausage casing, one end of the casing is inserted through a rotatable twisting head 64 (see Figs. 2, 15 and 16) mounted at the free end of an arm 65 secured at the other end between upright supports 66 and 67. These supports are secured at their lower ends to the top and rear of the base 11, free from the periphery of the container 24. Countershaft 48 extends upwardly from the base adjacent the support 66 into the arm 65 which is hollow and contains a gear 68 mounted upon the shaft 48. This gear meshes with an intermediate gear 69 mounted on a stub shaft 70 in the arm which meshes in turn with a gear 71 connected to the twisting head 64.

The twisting head is suitably mounted in bearings at the end of arm 65; it is hollow and somewhat flaring at the bottom and extends both above and below the arm. Secured to the portion which projects below the arm, by means of a ring 72, threaded or otherwise secured upon the end of the twisting head are a number of rollers 73 extending radially all around the head for the purpose of guiding the sausage casing into the twisting head.

At the top of the twisting head mounted upon a ring 74 (see also Fig. 16) which is threaded or otherwise secured to the projecting end thereof are friction rollers 75. Each roller is mounted in a yoke 76 having angular ends and cross connected between the ends at the outer side of the roller, the lower angular ends being pivoted in the ring 74 on pivots 77 and each roller being mounted upon a bearing pin 78 at the angle of the yoke so that it projects inwardly over the opening of the twisting head 64. The two opposite rollers are drawn together by springs 79, one at each end of the yokes 76, one end of each spring being connected to a projection 80 at the end of the yoke. The rollers are drawn closely together by the springs so that the sausage casing inserted therethrough will be engaged by the rollers allowing the casing to move freely through the twisting head, and the surfaces of the rollers are preferably formed with ribs 81 which grip the surfaces of the sausage casings as they pass from the twisting heads.

Also connected to the shaft 48 below the arm 65 is a sprocket 82 connected by a chain 83 with a sprocket 84 mounted to rotate on a stub shaft 85 secured in a bearing 86 carried by upright support 66 by means of a fastening screw 87. A spur gear 88 is mounted on the hub of sprocket 84 and meshes with a gear 89 mounted upon a vertical shaft 90 located within the hollow portion of support 66. The shaft is supported at its lower end in a bearing block 91 and at its upper end in a bearing block 92. Between the upper and lower bearings, is a driving roller 93 secured to the shaft and tapered toward the bottom.

A reversed tapered roller 94 parallel with the roller 93 is mounted upon a shaft 95 carried by the end bearing block 91 at the bottom, and the reduced upper end of the roller is mounted to rotate in block 92. A bearing plug 96 in the top of the roller 95 carries the end of an upwardly extending shaft 97 which is pinned to the end of the roller 94, for transmitting motion to the upper driving head.

To connect the rollers 93 and 94, a driving belt 98 is extended around them and a belt tightener pulley 99 is mounted upon a shaft 100 having an adjustable mounting at the top and at the bottom comprising a threaded stem 101 projecting from the adjacent bearing block 91 or 92 and through the end of the shaft 100, with a lock nut 102 adjustable on the stem.

By varying the height of the driving belt 98, the driving relation between the rollers 93 and 94 may be changed as desired. In the arrangement shown, the lowest driving ratio is with the belt at the lowermost position, and the highest driving ratio with the belt at its uppermost position. To shift the belt a vertical rod 103 is mounted in the support 66 extending through the upper bearing block 92 and having upper and lower projections 103a and 103b with rollers thereon near its lower end, adapted to extend above and below one reach of the belt 98. As the rod is raised or lowered, the belt is correspondingly raised in position changing the driving ratio between the rollers 93 and 94.

A feeding head 104 is adjustably mounted at the upper end of the upright support 66 and comprises a plate 105 vertically slidable in guides 106 at the inner side of the support. Attached to this plate is a rack 107 having a pinion 108 meshing therewith and mounted upon a shaft 109 which extends to the other side of the support where it terminates in a squared head 110 adapted to be engaged by a crank 111.

Attached to the inner side of the plate 105 is a bearing 112 carrying a pinion 113 mounted upon the shaft 97 by a longitudinal keyway 97a for rotary driving connection and free adjustment lengthwise of the shaft.

Meshing with the pinion 113 within the support 66 is a bevel gear 114 mounted on a shaft 115 carried by a bearing 116 which projects through an opening 117 in the plate 105 and also is secured to the plate from the outside by bolts 118. At the outer end of this shaft is a main driving pulley 120.

This adjustable head is to vary the length of the links produced by the machine, longer links requiring a faster movement of the filled casing and a faster movement of the driving pulley 120. A greater distance is also required between the twisting head and the casing driving means. Rod 103 is therefore attached at its upper end by a projection 121 extending from the bearing 112 so that as the head 104 and including plate 105 is raised by the rack and pinion mechanism, the driving belt 98 is correspondingly raised to increase the driving ratio between rollers 93 and 94.

For convenience, a link length indicator scale 122 (Fig. 11) is located at the edge of the upright 66 with a pointer 123 (Fig. 17) extending from a projection at one side of the bearing 116 over the edge of the support 66.

Mounted upon the driving head 104 are guide pulleys 124, a terminal pulley 125 and a tensioning pulley 126 for carrying a belt 127. When the driving head is adjusted to the proper height a clamping screw 128 extending through the projection which carries pointer 23, is moved into engagement with the plate 105 by a hand wheel 129 to bind it tightly in engagement with the support 66 so that the parts will not become accidentally dislodged during any particular run. The outer end of the belt 127 is substantially in alignment with the inner edge of the twisting head 64 so that the sausage casing will pass directly from the twisting head upon the belt. To adjust the tensioning pulley 126 it is mounted upon a bearing adjustable in a slot 130 of the feeding head by a hand screw 131. The driving pulleys in the head are preferably slightly crowned which causes a corresponding curvature of the driving belt 127.

A frictional contact belt 135 (see Figs. 9, 10 and 17) is yieldingly mounted to engage the sausage casings and press them toward the driving belt 127 and to provide a positive drive at the opposite outer side of the sausage casing. This belt 135 has a driving pulley 136 mounted upon a shaft 137 with a driving gear 138 at its other end in driving connection with a gear 139 mounted on a shaft 134 suported at one side of the pulley 125 by a bearing sleeve 140. The pulley 136 and its shaft 137 are mounted for swinging movement with respect to the pulley 125 without disengaging their gears 138 and 139 by means of a holder frame 141 having spaced upper and lower arms 142 and 143 (Fig. 2) mounting it to swing within a casing 144 upon pivots 145 and 146 at the top and bottom of the casing respectively. The casing 144 is secured to a collar 133 adjustably secured to the bearing sleeve 140 by means of screws 132 inserted into upper and lower projections 133a and 133b from the collar 133. These pivots 145 and 146 are located upon an axis which extends between the meshing edges of the gears 138 and 139 and the holder frame 141 is limited in movement by engagement with the inside of the casing 144 as shown more clearly by Fig. 17.

The swinging movement of the holder 141 is restrained and it is drawn inwardly by a spring 147 connected at one end, as shown in Fig. 10, with a projection 148 at the bottom of the holder frame 141 and connected at the other end to a threaded stem 149 which extends through an ear 150 projecting downwardly from a frame 154 mounted upon bearing sleeve 140, and with a thumb screw 151 on the threaded end of the stem 149 bearing against the opposite side of the ear 150.

The holder frame 141 extends vertically at the end of the feeding head 104 and carries rollers 152 and 153 engaged by the belt 135 which also passes around pulley 136 and parallel with that portion of the belt 127 carried by the outer end of the head between pulleys 125 and the two pulleys 124 next above it.

With this construction, a sausage casing is extended upwardly from the twisting head between the belts 127 and 135 where it is engaged by the resilient contact of the outer belt 135 with the inner belt 127, the variation of the thickness of the sausage casing being taken up by spring 147 without disengaging the driving gears 138 and 139.

Also carried by the feeding head 104 and actuated by a relative movement of the holder 141 is a switch mechanism (see Figs. 9 and 10) comprising a micro-switch 155 having conductors 156 and 157 leading therefrom. A switch contact 158 extends from the switch 155 which closes the switch when it is pressed inwardly. Mounted within a switch box 160 carried by the frame 154 is an arm 161 mounted on a stub shaft 162 extending outwardly from the switch box and carrying a spring blade 163 adapted to engage the contact 158 at the inside of the switch box. This switch closing movement is opposed by a spring 164 within the switch box engaging the outer end of the arm 161 and tending to press it outwardly.

At the outside of the switch box and mounted upon the outer end of the shaft 162 is a holder 165 adjustably connected to the shaft 162 by a set screw 166. Within a recess 167 of this holder, a projecting arm 168 is mounted upon a cross pin 169 to swing up and down in the recess and limited in downward movement by a screw 170 extending through the arm against the bottom of the recess and having a lock nut 171 movable upon the screw to hold it in place in the arm 168. At the outer end of the arm 168 is an inclined wedging projection 172 extending laterally from the arm so that the arm is movable when the wedging projection is engaged against the spring 164 within the box 160 to engage the spring blade 163 with the switch projection 158. This movement of the arm 168 is effected by means of an opposite wedging projection 173 at one end of an arm 174 which projects above and beyond the end of arm 168. The other end of arm 174 is held adjustably in engagement with holder frame 141 by means of a set screw 175 which extends through a slot 176 in the end of the arm 174. The arrangement of these wedging surfaces 172 and 173 is such that when the holder frame 141 is pulled inwardly upon its pivots 145 and 146 by spring 147 to the position as shown in Figs. 9 and 10 when there is no sausage casing between the rollers 125 and 136, the wedging projections 172 is moved within and out of contact with the wedging projections 173 and in this position, the contact arm 161 is pressed upwardly by its spring 164 to open the switch, thereby shutting off the driving motor. This movement of the switch contact arm 161 is limited by a stop screw 177 extending through the switch casing 160 and held in any adjusted position by a set screw 178.

When the belt 136 is swung away to insert a sausage casing from the side between the belts 127 and 135, the holder frame 141 mounting the outer driving belt 135 is swung outwardly upon its pivots 145 and 146 engaging wedging projection 172 below wedging projection 172, thereby pressing the arm 168 upwardly upon its pivot 169 without rotating the stub shaft 162 and without closing the switch. The wedging projections then pass outwardly beyond each other and as they are drawn together by the spring 147, the projection 172 passes above the projection 172 pressing it and its arm 168 downwardly. This will operate the switch to close the connection between conductors 156 and 157 for energizing the driving motor 10. Thus the starting and stopping of the motor is automatic; it is started when a sausage casing is inserted between the driving belts and it is stopped when there is no sausage casing between the driving belts.

Since the twisting head and the container 24 are constantly driven at suitably related speeds, and the driving belts 127 and 154 are also driven constantly, an intermediate motion must be given to the link forming mechanism which is obtained from shaft 48 and gear 68 which is connected by the intermediate gear 69 with the gear 71 which rotates the twisting head 64. Secured to or rotatable with the gear 69 is a cam 180 (Figs. 2 and 14) having an outer engaging portion 181 for approximately one-third of its circular extent, and this portion is engaged by a roller 182 carried by an arm 183 secured at one end to a fixed support on the hollow arm and at the other end to a lateral projection 187 from the arm 183. The spring tends to hold the roller 182 in a limiting position against a stop plate 188 having an upwardly turned projection 189 adapted to engage the side of the arm 183 opposite the spring 186, the plate passing under the arm 183 and having a slotted portion 190 through which a fastening stud 191 is inserted into the bottom of the hollow arm for adjustably holding the clamping plate in any adjusted position.

The link forming mechanism is operated by this intermittently movable shaft 184 as shown more clearly in Figs. 1, 2 and 11 to 14. Above the upper end of the intermediate shaft 184 is a yoke 192 mounted for free rotation in supports 66 and 67 about a transverse axis upon adjustable pivots 193 and 194 extending inwardly from the supports. This yoke has downward projections 195 through which extend extremities 196 of a somewhat rectangular U-shaped holder 197 held tightly on the yoke by lock nuts 198 threaded on the extremities on opposite sides of the projections 195. The outer end of this holder extends beyond the top of the twisting head 64 and the sides are spaced sufficiently apart so that any sausage casing within the capacity of the machine will pass freely between them.

Mounted to slide on one side of the holder is a sleeve 200 having a gripper 201 secured to one end and projecting toward the other side of the holder with a hollow guide 202 surrounding a sleeve member 203 on the other side of the gripper. This sleeve member 203 is also slidable on side of the gripper arm, and at its outer end is a gripper 204 extending oppositely to the gripper 201 having a guide 205 slidable on the opposite side of the holder. These two grippers 201 and 204 are substantially V-shaped, formed of somewhat flat material with the inner edge of each gripper turned upwardly in a flange 206. One gripper 201 overlaps the other to provide a wide opening as shown in Fig. 12 when they are moved apart, and the angular flanged ends being drawn closely together in the casing gripping and link forming position.

Each of the grippers 201 and 204 is moved by its corresponding sleeve and by the timed rotation of the intermittently movable shaft 184. Secured at the top of this shaft is a cross lever 211 having a swivel mounting 212 at each end. One swivel mounting has a pivotal connection with a link 213 attached at its end to a swivel mounting 214 carried by a clamp 215 attachable adjustably on sleeve 200. Similarly the other swivel mounting 212 is pivotally connected to one end of a link 216 attached at its other end to a swivel mounting 217 carried by a clamp 218 adjustably secured to the other sleeve 203.

When the cross lever 211 is in cross position parallel with the yoke, the two grippers 201 and 204 are moved closely together to form a joint between casing links and to hold the casing while the twisting head is rotated. When shaft 184 is rocked at an angle to the yoke as shown in Fig. 12, the grippers are separated allowing the holder to move relatively to the casing to a new position for forming a joint or link in the casing.

Thus the yoke 192 in which the extremities of the holder 197 are mounted, will rock about its pivots 193 and 194 allowing the holder which is held tightly by the yoke to swing up and down at its outer or free end, and at the same time the grippers 201 and 204 are reciprocated toward and from each other. This allows the grippers to swing upwardly with the holder 93 in contact with the twisted casing to its uppermost position and to the limit of movement of the holder whereupon the grippers are released.

They are spaced apart by the rocking of the cross lever 211 and its connected parts, and the holder and the grippers drop by their own weight to the lowermost position.

At the lower limit of movement of the holder 197, its position is determined by a stop 219 threaded into a projection of top plate 185 having a lock nut 220 for securing it in place, and a bumper 221 of rubber or similar material at its upper end to engage a projection 222 secured to and extending outwardly from yoke 192. In its lowermost position as determined by the stop 219, the holder 197 is engaged by a latch as shown by Figs. 2, 12 and 13, comprising an arm 233 mounted at its lower end in a bracket 234 secured to top plate 185 and having ears 235 for mounting a pivot 236 which carries the arm 233. Also extending from the bracket is a fixed projection 237 for carrying an adjustable stop screw 238 to limit the movement of arm 233, and a screw 239 held adjustably by a locking nut 240 and extending through the arm 233.

Adjustably secured to the upper end of the arm 233 by fastening screws 241 and slots 242 is a gripper 243 having an outer bevel edge 244 and a shoulder forming a notch or hook 245 for engaging a rib 246 projecting from a clamping sleeve 247 which is adjustably secured to sleeve 200 on the holder 197 by means of fastening screws 248.

The movement of gripper 243 is limited by the adjustable stop screw 238 in one direction and by a spring 250 mounted upon the screw 239 in the other direction. This screw 239 extends freely through a larger opening 249 in arm 233, and the spring is mounted on the screw between a head 251 and a washer 252 abutting the arm 233. Thus the spring tends to hold the arm 233 yieldingly against the stop screw 238 but permits the arm to be sprung outwardly away from the stop when the rib 246 projecting from clamp sleeve 247 moves downwardly with the holder 197 against the outer beveled edge 244 of the arm.

In this construction, the rib 246 is engaged by the gripper 243 as the sleeve 200 is moved along the holder 197 until both grippers 201 and 204 are in engagement with the casing between them whereupon the rib slips from one end and free from the holding hook 245, allowing the holder 197 to move upwardly with the linked casing. This construction has the advantage that the rib 246 movable with the sleeve 200 will engage and continue contact with the gripper 243 for a limited distance during the swinging movement of the holder 197 and during the reciprocating movement of both sleeves 200 and 203 upon the holder 197.

A brief summary of this operation is that the grippers 201 and 204 are spaced apart by the movement of their sleeves 200 and 203 respectively just below the casing driving head. This allows the holder to fall by gravity, its downward movement being cushioned and limited by the stop 219. In the lowermost position, one side of the gripper is engaged by the latching mechanism which holds it while the grippers 201 and 202 are moved oppositely together by their sleeves and the operation of cross lever 11, the arrangement being that the grippers tighten about the sausage casing to hold it for the length of the link as previously determined.

As the upward movement of the casing by the driving head is continuous, the engagement of the grippers with the sausage casing causes the holder 197 to move upwardly and at this time, the movement of the sleeve 200 with respect to the latch mechanism is such that the latch slips off the plate 246 when the gripping members are tightly engaged with the sausage and consequently move upwardly with it.

The grippers in effect hold each link during the continued upward movement of the entire casing, thus localizing the twist of the casing to the part below the grippers, and as soon as the grippers are released, they drop to pick up a new link which has already been twisted with respect to the previously linked sausages. The previously linked sausages which are held by the belts 127 and 135 are therefore free from the twisting movement, but the twist in the casing which makes the links is maintained by the material of the casing and by the holding of the casing above and below the gripping means.

After the linked casing passes upwardly over the feeding belt 127, it engages a downwardly extending guide trough 260 which has a pivot 261 at its upper end for mounting it to swing upon the support 66 to vary the outward inclination of the trough. A carrier 263 for the trough may be supported by an arm 264 adjustable in length, connected at its outer end to the carrier and to a pivot 265 on the support 66. At the lower end of the trough is a clamp 266 for securing the trough and carrier adjustably together. With this construction the inclination of the trough may be varied as desired by adjusting the length of the arm 264.

In the operation of this machine, filled sausage casings are coiled in receptacles 24 as shown in Figs. 3, 4 and 5, and a receptacle containing the casings is placed upon the rotatable table 23. The end of a filled casing is then threaded through the twisting head 64, the holder 197 and upwardly through the feeding head 104 between the belts 127 and 135. This movement of the belt 154 and its supporting means closes the switch 155 for energizing the driving motor which thereupon rotates the table 23, the twisting head and through the tapered roller drive actuates the driving belts 127 and 135, at a speed determined by the length of sausage which is desired. The gripping holder 197 oscillates between the twisting head 64 and the feeding head 104, the length of stroke depending upon the preliminary setting of the feeding head 104. The gripper 197 is restrained by the latch at the lower end of its path which insures that the link is formed by firmly gripping the sausage casing, at the desired length, while the gripper is allowed to move upwardly with the casing. Since the operation of the twisting head is continuous, the gripper in seizing the sausage casing, effectively limits the twisting action of the head to that length of the casing below the gripper, freeing the previously linked sausages from any further twisting action as soon as they pass the gripper and while they are engaged by the belts 127 and 135 of the feeding head.

Several sausage casings may be secured together end to end for passage through this linking machine, or only one length of casing may be passed through at a time, as desired. As soon as any casing has been linked, or after it passes the driving belt 135, there is no casing between the belts 127 and 135, or if the thickness of the casing is insufficient, then the switch 155 will be operated to open the circuit for the driving motor, and the machine will stop. This also operates as a safety stop if the casing should become broken at any time.

To assist in counter-balancing the weight of the gripping holder 197 a spring 267 (Figs. 2 and 12) is connected at one end to the outer end of a bar 268 connected to the yoke 192 and extending inwardly from the pivots thereof. The other end of the spring is connected to a fastening clip 269 attached to a fixed support such as the rear end of the hollow arm 65. This spring is tensioned to partially overcome the weight of the holder 197 and the parts thereon, so that it will descend by gravity but will not engage the bumper post too violently.

To insert a sausage casing into the machine one end of a filled casing is drawn upwardly from a container 24 through the twisting head 64, by inserting a wire hook downwardly through the twisted head to engage the end of the casing, or in any other suitable manner, and to engage it between the belts 127 and 135 it is necessary only to swing the belt 135 outwardly upon its pivots 145 and 146 by engaging a projecting handle 270 which swings the belt 135 outwardly so that the sausage casing can be inserted at the outer side. This causes the engagement of the wedging projections 172 and 173 to close the electrical switch for starting the driving motor 10 and thus placing the machine in operation.

While a preferred construction and operation of the machine has been thus described in detail, it should be regarded by way of illustration and example rather than a restriction or limitation of the invention as various changes in the construction and arrangement of the parts may be made without departing from the spirit and scope of the invention.

I claim:

1. In a sausage linking machine having a supporting frame, a rotatable twisting head mounted on the frame, means also mounted on the frame for feeding a stuffed casing to the twisting head, continuously operating means for pulling the sausage casing through the twisting head, a linking holder mounted on the frame to move between the twisting head and the pulling means, grippers mounted on the holder movable to and from a position gripping the casing to form a link and to connect the holder for movement with the casing, and means operatively associated with the grippers to reciprocate the grippers to and from the casing gripping position.

2. In a sausage linking machine according to claim 1, the grippers being oppositely movable to engage the casing near the twisting head for defining the end of a link, and means associated with the grippers to disengage them for reverse movement separate from the casing.

3. In a sausage linking machine in accordance with claim 1, the grippers being oppositely movable to engage the casing above the twisting head to form a link and movable with the casing, and means associated with the grippers to move them apart and to disengage them from the casing for reverse movement separate from the casing.

4. In a sausage linking machine according to claim 1, a rotatable table on the frame for receiving coiled and stuffed casings, the grippers being oppositely movable to engage the casing near the twisting head to form a link and movable with the casing, means associated with the grippers to disengage them from the casing for reverse movement, and common driving means in the frame for rotating the table, for rotating the twisting head and for operating the continuous pulling means.

5. In a sausage linking machine in accordance with claim 4, in which the driving means includes a switch operatively associated with one of the engaging grippers for starting and stopping the driving means depending upon the presence of a casing in the gripper engaging means.

6. In a sausage linking machine in accordance with claim 4 including differential driving means between the rotatable table and the twisting head which varies the relative movement of the table and head.

7. In a sausage linking machine in accordance with claim 4, comprising adjustable means associated with the pulling means above the twisting head to change the length of the sausage link, speed changing mechanism associated with the driving means to vary the speed of the pulling means in accordance with the change in the length of the sausage link, and other speed changing mechanism in connection with the driving means for rotating the twisting head at a different speed than the means for rotating the coiled and stuffed casing which is to be linked.

8. In a sausage linking machine in accordance with claim 1, a rotatable table associated with the twisting head for receiving a stuffed and circularly coiled casing within the table and uncoiling the casing as the table is rotated, and means in the frame associated with the table and the twisting head for rotating the twisting head in accordance with the rotation of the table.

9. In a sausage linking machine in accordance with claim 1, comprising latch means mounted on the frame and slidingly engaging the holder as it is moved with the casing by the engagement of the grippers, and means operatively associated with the grippers to disengage them from the latch means and to move them in and out of the gripping position.

10. In a sausage linking machine in accordance with claim 1 in which the grippers are movable on the sides of the holder and have oppositely disposed parts to grip a sausage casing therebetween and movable apart to extend them for movement free from the casing and in a direction opposite to the movement of the casing, and stop means on the frame for engaging the holder in its movement when the grippers are free from the casing.

11. In a sausage linking machine in accordance with claim 1, including sleeves which are slidable on the holder, one of the sleeves having a longitudinal rib, a latch on the machine frame to engage the rib in the lower position of the holder, the said grippers being carried by the sleeves and engaging the casing, means associated with the grippers to stop the turning of the casing above the holder during such engagement, and the said latch sliding upon the rib and free from the end of the rib as the sleeves are reciprocated and the holder is moved upwardly.

12. In a sausage linking machine in accordance with claim 1 in which the grippers include rollers at the top of the twisting head mounted thereon to engage opposite sides of the casing and rotatable with the head, the rollers having spaced ribs extending around them, and resilient means connecting the rollers and tending to draw them together.

13. In a sausage linking machine in accordance with claim 1, in which the holder has parallel supporting portions on opposite sides of the head, sleeves slidable on the said supporting portions, the grippers being attached to the ends of the sleeves, the means operatively associated with the grippers moving the sleeves oppositely to bring the grippers together and to move them apart from around the sausage casing, and the grippers causing the holder to move with the casing and to stop its rotation above the casing when they are moved together to grip the casing.

14. In a sausage linking machine according to claim 13, including latch means associated with the grippers engaging one of the sleeves to delay the disengagement of the grippers from the sausage casing as the holder is moved upwardly from the twisting head.

15. In a sausage linking machine in accordance with claim 13 in which the grippers are angular and are attached to each of the sleeves in overlapping relation with each other with the angular portions disposed oppositely so that a sausage casing may pass through freely between the angular portions when separated and will be squeezed tightly together to form a link in the sausage and thereby to stop the twisting movement of the casing above the grippers when they are moved together.

16. In a sausage linking machine in accordance with claim 1, including adjustable means in the frame associated with the pulling means varying the height thereof above the twisting head to correspondingly change the length of a link in the sausage, and speed changing mechanism associated with the driving and the pulling means for varying the speed of the pulling means in accordance with the change in length of the link by the adjustable means.

17. In a sausage linking machine in accordance with claim 16 in which the pulling means comprises a pair of reversely disposed conical driving rollers, a driving belt in the driving means connecting the driving rollers, and a connection between the said adjustable means and the driving belt for varying the belt position upon the rollers in accordance with the length of the link caused by the variation of the adjusting means.

18. In a sausage linking machine in accordance with claim 16, in which the pulling means includes mounting means associated therewith for raising and lowering the pulling means including a movable rack, a variable driving gear in the frame for the pulling means comprising oppositely disposed conical rollers and a belt extending around them, a connection with the mounting means for engaging the belt and moving it as the rack is raised and lowered and a crank with a pinion engaging the rack to raise and lower the mounting means and to change the speed of the driving means in accordance with the change in height of the pulling means.

19. In a sausage linking machine in accordance with claim 1, the pulling means comprising a pair of belts for engaging opposite sides of a sausage casing, one of the belts being mounted to swing away from the other belt to admit a casing therebetween, and meshing gears for driving the belts, one gear pivoted to swing about an axis in the teeth of the other gear to maintain connection when one belt is swung away from the other.

20. In a sausage linking machine in accordance with claim 19, the pulling means comprising a casing head adjustably mounted in the frame above and spaced from the twisting head, the pulling head having a belt extending above the twisting head upwardly and over the pulling head, another belt having a substantially straight run to extend parallel with the other belt above the twisting head, means mounting the second belt in the frame to swing outwardly from the first belt to include a sausage casing therebetween, and belt driving means including two meshing gears for the two belts.

21. In a sausage linking machine according to claim 19, comprising a trough on the machine extending from the pulling head to receive a sausage casing from one of the belts and to direct it away from the machine.

22. In a sausage linking machine in accordance with claim 19, in which there is a spring tending to draw the two belts together and the movable belt has a projecting handle for swinging it away from the other belt so that sausage casings may be fed endwise between the belts in engaging them for continuous pulling movement between the belts.

23. In a sausage linking machine according to claim 20, including driving means for the twisting head and driving head belts and controlling means operated by the belt mounted to swing for starting the said driving means when a casing of sufficient thickness is between the belts and for stopping the driving means when there is no casing between the belts or the portion between the belts is not of sufficient thickness.

24. A sausage linking machine in accordance with claim 23, in which the driving means for the twisting head and the driving head belts comprises an electric motor, and a motor control circuit including a switch operated by the belt mounted to swing, to start and stop the motor depending upon the thickness of a sausage casing between the belts.

ERIC W. ANDERSON.

References Cited in the file of this patent

UNITED STATES PATENTS

| Number | Name | Date |
|---|---|---|
| 1,195,043 | Lidback | Aug. 15, 1916 |
| 1,419,985 | Reisfeld | June 20, 1922 |
| 1,442,232 | Neuberth | Jan. 16, 1923 |
| 1,545,586 | Kruse | July 14, 1925 |
| 1,557,830 | Gurley | Oct. 20, 1925 |
| 1,701,713 | Allen et al. | Feb. 12, 1929 |
| 1,906,372 | Flynt | May 2, 1933 |
| 2,229,590 | Popp | Jan. 21, 1941 |
| 2,282,666 | McCue | May 12, 1942 |
| 2,355,071 | Hendrickson | Aug. 8, 1944 |